(12) United States Patent
Stephan

(10) Patent No.: US 8,302,312 B2
(45) Date of Patent: Nov. 6, 2012

(54) METHOD FOR PRODUCING A FUSELAGE AIRFRAME OF AN AIRCRAFT

(75) Inventor: Andreas Stephan, Fredenbeck (DE)

(73) Assignee: Airbus Operations GmbH, Hamburg (DE)

( * ) Notice: Subject to any disclaimer, the term of this patent is extended or adjusted under 35 U.S.C. 154(b) by 213 days.

(21) Appl. No.: 12/721,085

(22) Filed: Mar. 10, 2010

(65) Prior Publication Data

US 2010/0192377 A1 Aug. 5, 2010

Related U.S. Application Data

(63) Continuation of application No. PCT/EP2008/057345, filed on Jun. 12, 2008.

(60) Provisional application No. 60/994,279, filed on Sep. 18, 2007.

(30) Foreign Application Priority Data

Sep. 18, 2007 (DE) .......................... 10 2007 044 387

(51) Int. Cl.
*B21D 53/88* (2006.01)

(52) U.S. Cl. ... 29/897.2; 29/897; 29/525.01; 29/525.06; 227/51; 227/52; 227/156

(58) Field of Classification Search ................ 29/897.2, 29/897, 525.06, 525.01; 227/52, 51, 156
See application file for complete search history.

(56) References Cited

U.S. PATENT DOCUMENTS

| 4,967,947 | A | * | 11/1990 | Sarh ................................ 227/52 |
| 6,408,517 | B1 | | 6/2002 | Lehmker et al. |
| 6,481,096 | B2 | | 11/2002 | Lehmker et al. |
| 6,505,393 | B2 | * | 1/2003 | Stoewer et al. ............ 29/525.06 |
| 7,166,251 | B2 | | 1/2007 | Blankinship |
| 2002/0007548 | A1 | | 1/2002 | Stoewer et al. |
| 2006/0162140 | A1 | | 7/2006 | Frauen et al. |
| 2010/0031509 | A1 | | 2/2010 | Frauen et al. |

FOREIGN PATENT DOCUMENTS

DE 712 525 A 10/1941

(Continued)

OTHER PUBLICATIONS

German Office Action for DE 10 2007 044 387.2 dated Sep. 3, 2009.

(Continued)

*Primary Examiner* — Richard Chang
(74) *Attorney, Agent, or Firm* — Jenkins, Wilson, Taylor & Hunt, P.A.

(57) ABSTRACT

Disclosed is a method for producing a fuselage of an aircraft, wherein several fuselage sections that are arranged one behind another are joined together, comprises the following steps:
a) production of an outer skin segment, the outer skin segment having on the underside a continuous longitudinal opening,
b) widening the outer skin segment in order to introduce at least one floor frame,
c) joining the outer skin segments to a rigid fuselage section which is already present, with the formation of a partial transverse seam,
d) positioning a prefabricated lower shell in the longitudinal opening, in order to close the outer skin segment on the peripheral side,
e) completing the partial transverse seam to form a transverse seam and joining the lower shell together with the outer skin segment with the formation of at least two longitudinal seams, and
f) joining the floor frame together with the outer skin segment.

14 Claims, 3 Drawing Sheets

FOREIGN PATENT DOCUMENTS

| | | |
|---|---|---|
| DE | 102004056286 | 5/2006 |
| DE | 10 2005 54869 A1 | 5/2007 |
| EP | 1063166 A | 12/2000 |
| ES | 2251270 A1 | 4/2006 |
| GB | 2326863 A | 1/1999 |
| WO | WO 2007/057411 | 5/2007 |
| WO | WO 2009/037007 | 3/2009 |

OTHER PUBLICATIONS

International Search Report for PCT/EP2008/057345 dated Sep. 19, 2008.

Decision on Granting for Russian Application Serial No. 2010114852/11 (020997) dated Apr. 24, 2012.

* cited by examiner

METHOD FOR PRODUCING A FUSELAGE AIRFRAME OF AN AIRCRAFT

CROSS-REFERENCE TO RELATED APPLICATIONS

This application is a continuation of PCT International Application No. PCT/EP2008/057345 filed Jun. 12, 2008, which claims the benefit of U.S. Provisional Application No. 60/994,279, filed Sep. 18, 2007 and German Patent Application No. 10 2007 044 387.2, filed Sep. 18, 2007, the entire disclosures of which are herein incorporated by reference.

FIELD OF THE INVENTION

The invention relates to a method for producing a fuselage airframe of an aircraft, in which method a plurality of fuselage sections positioned in tandem are joined together.

Nowadays, fuselage sections for aircraft are frequently still produced in the tried and tested shell construction method using aluminium alloy sheets. Depending on the type of aircraft and the required fuselage diameter, a fuselage section is formed with from four to eight shell segments which are usually joined together by riveting to form a complete fuselage section. To form the complete fuselage airframe of the aircraft, a plurality of fuselage sections prefabricated in this manner are then aligned in tandem and finally joined together.

During production of the necessary longitudinal seam connections between the individual shell segments during the prefabrication of the fuselage sections, the longitudinal seams are not completely riveted through in previously defined positions in the region of the transverse joints at one end of the fuselage section over a length which generally corresponds to at least one division of a former.

This portion which is not completely riveted through in the region of the end of the respective longitudinal seam is used to compensate the tolerance when the prefabricated fuselage sections are joined together by the possibility of a slight widening. A fuselage section which is still "flexible" in the initial region is joined to a rigid end of a fuselage section, the flexibility being obtained by the longitudinal seams which are not completely riveted through at the end, on the side to be joined of the fuselage section.

Such a possibility of tolerance compensation is necessary, since the fuselage sections which are to be joined together have large spatial dimensions and, due to unavoidable manufacturing tolerances, only have exactly the same diameter in exceptional cases.

Fuselage sections are to be increasingly produced integrally in shell construction by the longitudinal welding of shell segments which consist of aluminium alloy materials. Alternatively, it is considered producing the fuselage sections seamlessly using fibre reinforced plastics materials (composite material) by known computer-controlled winding or deposition methods. However, in the case of these rigid fuselage sections, there is no opportunity for tolerance compensation. For this reason, in both cases a wound fuselage section or a rigidly welded fuselage section is always combined in turn with a fuselage section composed of shell segments.

SUMMARY OF THE INVENTION

The object of the invention is to combine the advantages of conventional shell construction with the advantages of the production of rigid fuselage sections which are either formed by the longitudinal seam welding of aluminium shell segments or by winding or deposition methods using composite materials.

This object is achieved by a method with the following steps of claim 1:
a) production of an outer skin segment, the outer skin segment having on the underside a continuous longitudinal opening,
b) widening the outer skin segment in order to introduce at least one floor frame,
c) joining the outer skin segments to a rigid fuselage section which is already present, with the formation of a partial transverse seam,
d) positioning a prefabricated lower shell in the longitudinal opening, in order to close the outer skin segment on the peripheral side,
e) completing the partial transverse seam to form a transverse seam and joining the lower shell together with the outer skin segment with the formation of at least two longitudinal seams, and
f) joining the floor frame together with the outer skin segment.

By producing a fuselage section with an outer skin segment which is initially still open downwards, in other words an outer skin segment with a continuous longitudinal opening, a tolerance compensation is possible if the fuselage section is to be joined to a prefabricated, rigid fuselage section to form a fuselage airframe of an aircraft. For this purpose, the outer skin sheath in the joining region is widened or compressed if necessary starting from the continuous longitudinal opening until a seamless join is possible with the prefabricated fuselage section which is rigid particularly in respect of its diameter. The fuselage sections are connected together in the region of the transverse seam in a known manner by transverse seam connecting straps.

The already prefabricated fuselage section can be a fuselage section which is welded together with at least two shell segments consisting of an aluminium alloy material with the formation of longitudinal seams or a fuselage section which is wound or deposited integrally with a fibre reinforced plastics material. In the case of a fuselage section produced by known winding and/or deposition methods, carbon fibre reinforced epoxy resins are preferably used.

The aluminium shell segments are preferably welded together by the friction stir welding process to achieve a high quality of the longitudinal seam, the mechanical characteristics of which are comparable with those of the solid material. Alternatively, the fuselage section can also be formed with sheets of Glare®, i.e. a laminar layer construction of alternatingly full-surface bonded thin aluminium alloy sheets and glass fibre reinforced plastics material layers. In this case, the longitudinal seam is formed by riveting, screwing or bonding in order to restrict the thermal strain on the Glare®. In exceptional cases, if the Glare® sheets are provided with special connection regions, a direct join is possible by thermal joining processes and in particular by friction stir welding. A combination of conventional aluminium alloy sheets with Glare® sheets is quite possible. If the metal construction method is combined with the CFRP construction method (hybrid construction method), particular attention should be paid to corrosion problems in the contact region between the aluminium materials and the composite material.

A further fuselage section is joined to already existing fuselage sections in a plurality of steps according to the method of the invention.

First of all, an outer skin segment is prefabricated which has, according to the invention, a continuous longitudinal opening in its lower side. A cross-sectional surface of the outer skin segment forms a pitch circle or a curve segment of approximately 280°.

To introduce a floor frame or other fixture components (supporting beams, transverse supports etc), the outer skin segment is widened in the region of the longitudinal opening to such an extent that the floor frame can be introduced into the interior of the outer skin segment. A provisional fixing in position of the floor frame up until the complete connection thereof with the outer skin segment is effected with a large number of retaining bars which are linked in the ceiling area of the outer skin segment.

The outer skin segment is then joined to a fuselage section which is already prefabricated, which is usually effected by pushing the fuselage section to be joined onto so-called transverse butt straps which are arranged on the prefabricated fuselage section. The outer skin segment is always joined starting from the upper side on both sides running downwards with the formation of a partial transverse seam in order to successively work out or push out downwards on both sides possible "undulations or foldings" resulting due to tolerance variations of the still flexible outer skin segment. The continuous longitudinal opening in the region of the outer skin segment allows a tolerance compensation by slight widening or compression of the two sides of the outer skin segment which is still flexible at this stage. Thereafter, a preferably fully prefabricated lower shell is positioned and aligned in the underside longitudinal opening in the outer skin segment, as a result of which the outer skin segment is completed to form an outer skin which is closed over the periphery. At this time, the lower shell is already provided with all the stringer profiles and annular former segments.

The partial transverse seam is then completed on the lower side to form a complete encircling transverse seam and the lower shell is joined together with the outer skin segment with the formation of at least two longitudinal seams, as a result of which the outer skin segment is completed to form a complete fuselage section. In parallel with or at the end of this procedure, the reinforcing elements on the inside, in particular in the form of stringers and annular former segments, are joined together by stringer straps or former couplings. Alternatively, it is also possible for complete annular formers which are already closed per se to be introduced through the longitudinal opening and to be connected on the inside to the outer skin segment.

Finally, the floor frame and optionally supporting beams for supporting the floor frame are joined together with the outer skin segment and thus the final floor transverse support connection is formed. All the joining processes are carried out as a function of the materials to be joined in the specific individual case, by riveting, screwing, bonding or welding, in particular by friction stir welding.

The longitudinally slotted outer skin segment is preferably produced in the known winding method with a fibre reinforced plastics material, in particular with a carbon fibre reinforced epoxy resin. In this respect, the fibre reinforced plastics material is deposited on a winding core, the stringer profiles running in the longitudinal direction and being arranged on the inside also being formed as integral components of the outer skin segment preferably during the course of the winding process. The entire structure is preferably cured in only one pass through the autoclave. The annular formers or annular former segments required for reinforcement are introduced subsequently into the outer skin segment in a separate production step and are rigidly connected to the inside of the outer skin segment. If the annular former is not configured integrally, the annular former segments are interconnected by former couplings.

The open construction method described here with a continuous longitudinal opening greatly facilitates the removal of the winding core during the production of a wound outer skin segment in contrast to the production of a completely closed section in the winding process, as a result of which it is possible to produce relatively long cylindrical sections in the winding process.

When fibre reinforced plastics materials are used, the lower shell is generally prefabricated not by the winding process or deposition process, but by the layered deposition of the fibre reinforced plastics material on a correspondingly configured, substantially horizontally arranged mould, the stringer profiles preferably being formed at the same time. In a further working step, the annular former segments are connected on the inside and transverse supports which may be required are integrated with the inside of the outer skin of the lower shell. The different components can be selectively joined together by riveting, screwing, bonding or any combination thereof.

Alternatively, the outer skin partial segment and/or the lower shell to be inserted into said outer skin partial segment can be formed in the conventional aluminium construction method, for example with sheets of aluminium alloys. In this case, the longitudinal seams between the shell segments to provide the outer skin segment are preferably produced by the friction stir welding process. Alternatively, the joining procedure can also be carried out by riveting, screwing, bonding or any combination thereof. The stringer profiles and the annular former segments are integrated into the shell segments or outer skin of the lower shell in a known manner by riveting, welding or bonding. Accordingly, additional transverse supports which may be required are inserted into the lower shell.

If the outer skin segment and/or the lower shell is formed at least in regions with Glare® sheets, the joining procedure can then only be carried out by known welding processes if the Glare® sheets have thermally weldable joining regions in order to avoid impairment to the layer structure in the Glare® by the effect of heat and to avoid loss of strength caused thereby.

Further advantageous embodiments of the method are set out in the further claims.

DESCRIPTION OF EXEMPLARY EMBODIMENTS

Figure 1:
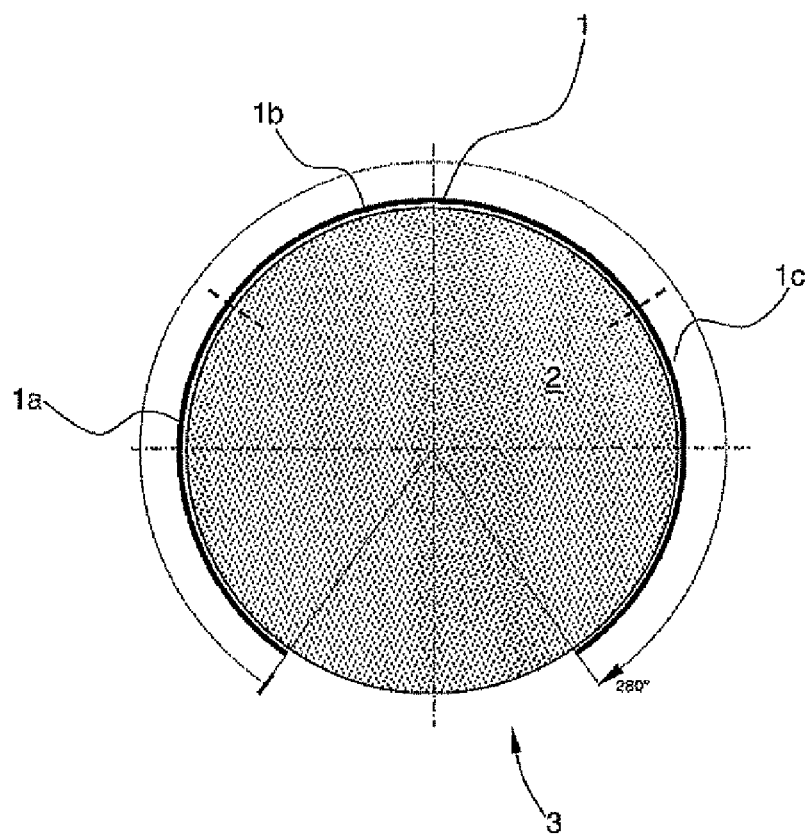
FIG. 1 is a schematised cross-sectional view of a winding core of an outer skin segment which is formed with a fibre reinforced plastics material and is open underneath.

FIG. 1 is a schematised cross-sectional view through an outer skin segment 1 formed with a fibre reinforced plastics material.

In a first step, the outer skin segment 1 is prefabricated with a fibre reinforced plastics material, in particular with a carbon fibre reinforced epoxy resin, for example on a winding core 2 by known deposition processes or winding processes. During this winding process, the stringer profiles which are not shown in FIG. 1 and which also run in the longitudinal direction of the outer skin segment 1, i.e. vertically to the plane of the drawing, are also formed integrally with the outer skin segment. To compensate tolerances, the outer skin sheath 1 has on its lower side a continuous longitudinal opening 3 (longitudinal slot) which runs vertically to the plane of the drawing. A cross-sectional surface (not shown in FIG. 1) of the outer skin segment 1 preferably forms a pitch circle of approximately 280° or has an aperture angle of 80°. Other aperture angles are also possible as long as the floor frame and other components to be introduced into the outer skin segment 1 can be introduced by widening the outer skin segment 1.

Alternatively, it is also possible to produce the outer skin segment 1 with, for example three shell segments 1a, 1b, 1c which are formed using aluminium alloy sheets or with Glare®sheets or a combination thereof, in the conventional aluminium construction method. In a combination of this type, the shell segments 1a, 1b, 1c are preferably joined together by friction stir welding along two longitudinal seams, as indicated by the two radially outwardly directed dashed lines, so that a fuselage section is produced which is substantially "rigid" in respect of its diameter. Instead of a three-part segmentation, the outer skin segment can also be constructed with two, four or any other number of shell segments.

Figure 2:
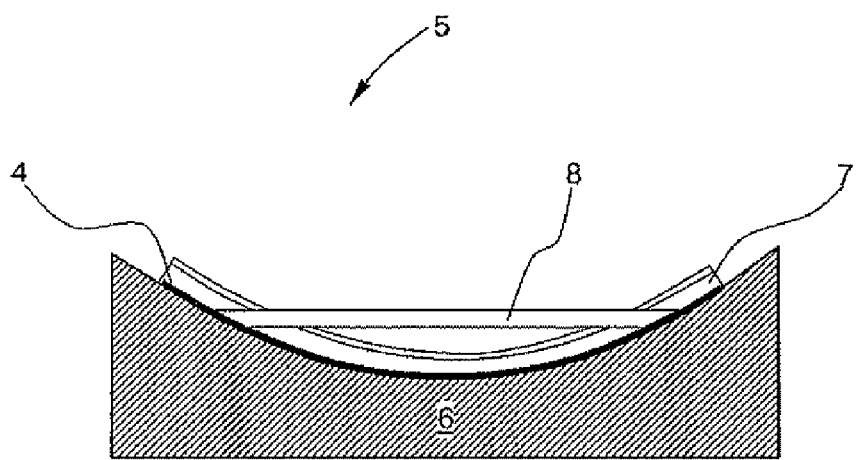
FIG. 2 is a cross-sectional view of an outer skin formed in particular with a fibre reinforced plastics material, for a lower shell with a mould for the deposition thereof.

FIG. 2 is also a heavily schematised cross-sectional view through an outer skin segment 4 of a lower shell 5 to be prefabricated, in a state removed from a moulding tool 6. The outer skin segment 4 is formed, for example on the moulding tool 6 by layered deposition of a fibre reinforced plastics material, in particular a carbon fibre reinforced epoxy resin, the stringer profiles (not shown) being formed integrally with the outer skin segment 4. The entire structure is then cured, for example, in an autoclave. In a further step, the lower shell 5 is completed by the integration of an annular former segment 7 and a transverse support 8, which are provided with a reference numeral as representation of the others. The annular former segment 7 and the transverse support 8 are preferably formed using the same fibre reinforced plastics material which is also used for the outer skin segment.

In principle, the outer skin segments 1, 4, the stringer profiles, the annular former segments and the transverse supports can be produced using aluminium alloys, Glare®, a fibre reinforced plastics material or any combination of these materials. The individual components are then joined together as a function of the specific material combination, for example by riveting, screwing, bonding, welding or a combination of the mentioned processes.

Figure 3:
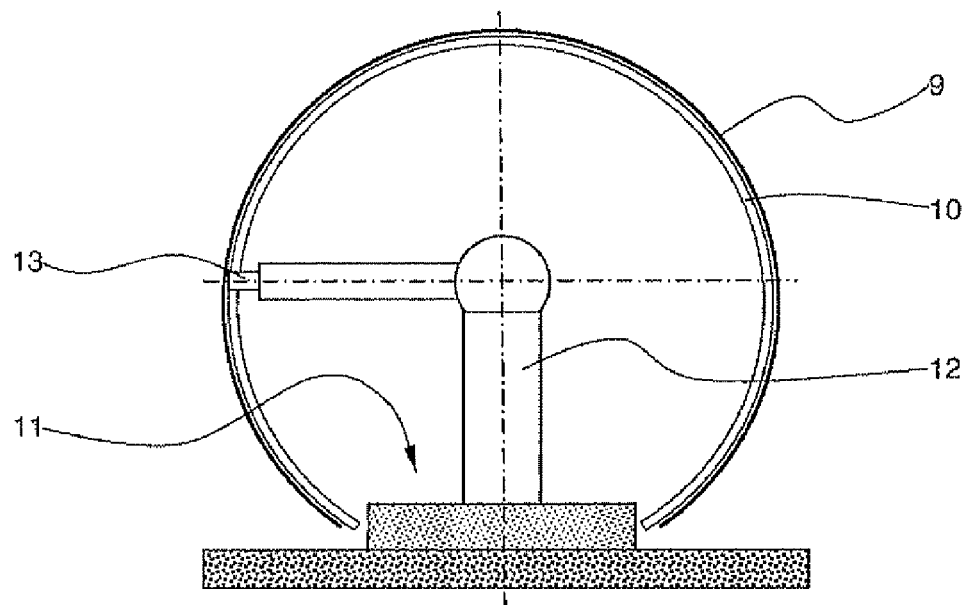
FIG. 3 is a side view of an outer skin segment with a handling device arraigned therein for processing.

FIG. 3 is a side view of an outer skin segment 9 with a tool arranged therein for further processing.

An outer skin segment 9 fixed in its position to a holding device (not shown) has on the inside an annular former 10 and stringer profiles (not shown). A handling device 12, in particular a standard articulated robot arm with at least six degrees of freedom, with a tool 13 can be introduced through a longitudinal opening 11 into the outer skin segment 9. Depending on the materials used, the tool 13 can be, for example a drill, a riveting tool, a welding tool, a glue gun or any combination thereof. The longitudinal opening 11 provides an excellent inner accessibility through the outer skin segment 9 for further processing steps. The outer skin segment 9 can be formed in the conventional aluminium construction method and in the known winding or depositing methods using fibre reinforced plastics materials.

Figure 4:
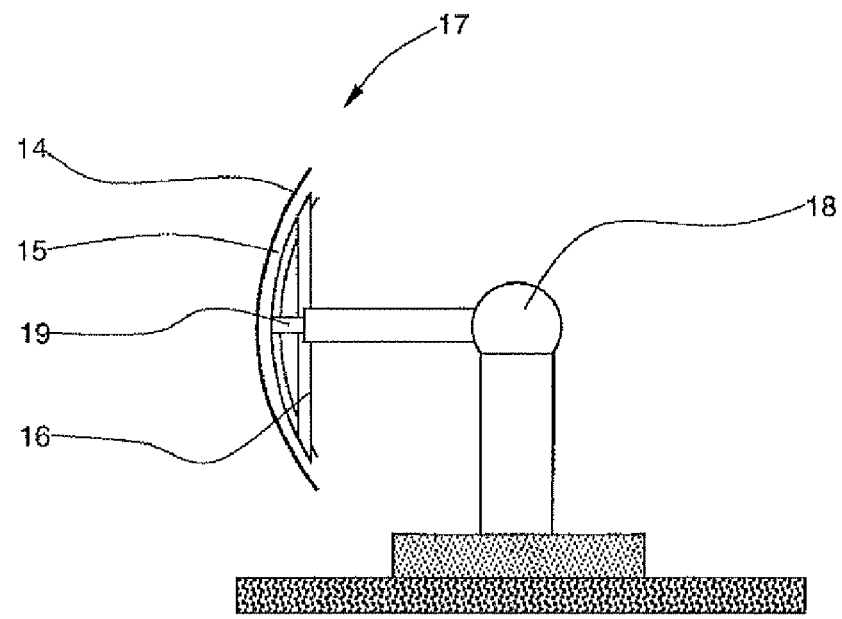
FIG. 4 is a side view of a lower shell and a handling device for processing.

FIG. 4 is a side view of an outer skin segment 14 which is fixed spatially in its position by a holding device (not shown) for further processing.

The outer skin segment 14 comprises an annular former segment 15 and a transverse support 16 to form a lower shell 17. Furthermore, a large number of stringer profiles (not shown) which run vertically to the plane of the drawing is arranged in the region of an inner surface of the outer skin segment 14. The lower shell 17 is processed by a handling device 18 with a tool 19. The tool 19 can be, for example a drill, a riveting tool, a welding tool or a glue gun. The tool 19 can have a plurality of different tools. The vertical fixing in position of the lower shell 17 provides an excellent inner accessibility of the lower shell 17 for the subsequent automatic or manual processing steps.

Reference will be made simultaneously to both FIG. 5 and FIG. 6 in the further description of the method.

Figure 5:
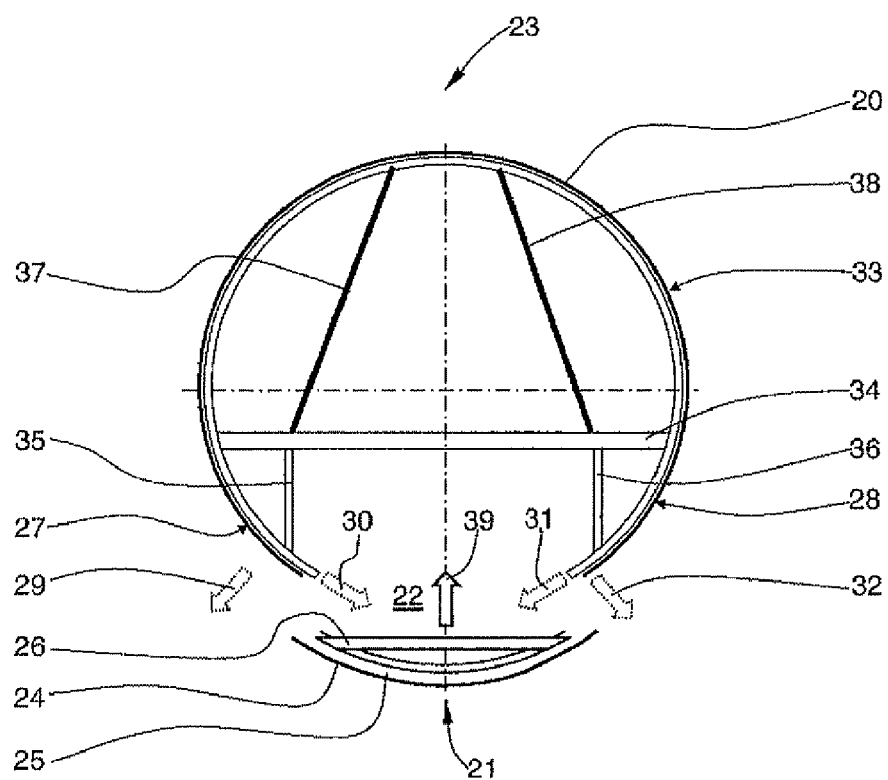
FIG. 5 is a side view of an outer skin segment with a suspended floor frame, support beams and an advanced lower shell.

In FIG. 5, an outer skin segment 20 configured with a longitudinal slot according to the invention is completed by fitting on the lower side a prefabricated lower shell 21 into a longitudinal opening 22 in the outer skin segment 20 to form a fuselage section 23. The lower shell 21 has, inter alia, an outer skin segment 24 with an angle at circumference of approximately 80°, an annular former segment 25 and a transverse support 26.

However, this completion step is only carried out when the outer skin segment 20 has already been joined with another prefabricated fuselage section (not shown in FIG. 5), with the formation of a partial transverse seam, in order to ensure a radial tolerance possibility by the widening or compression of the two sides 27, 28 in the direction of the arrows 29 to 32. In this respect, a partial transverse seam 33 extends over an angle at circumference which substantially corresponds to the angle at circumference of the outer skin segment 20, i.e. in the illustrated embodiment over an angle at circumference of approximately 280° (cf. FIG. 1).

Before the partial transverse seam is produced between the fuselage section 23 and a further fuselage section (not shown), a floor frame 34 and the two support beams 35, 36 are pre-fixed inside the outer skin segment 20. In addition, further components of the outer skin segment 20, for example complete annular formers, annular former segments, longitudinal reinforcements (stringer profiles) and all types of lines (for example supply and disposal lines, electrical lines, optical lines etc.) can be introduced through the longitudinal opening 22 in the outer skin profile 20 for an easier assembly. The position of the floor frame 34 or of the supporting beams 35, 36 is provisionally fixed by the retaining bars 37, 38 coupled on the ceiling in the outer skin segment 20.

Figure 6:
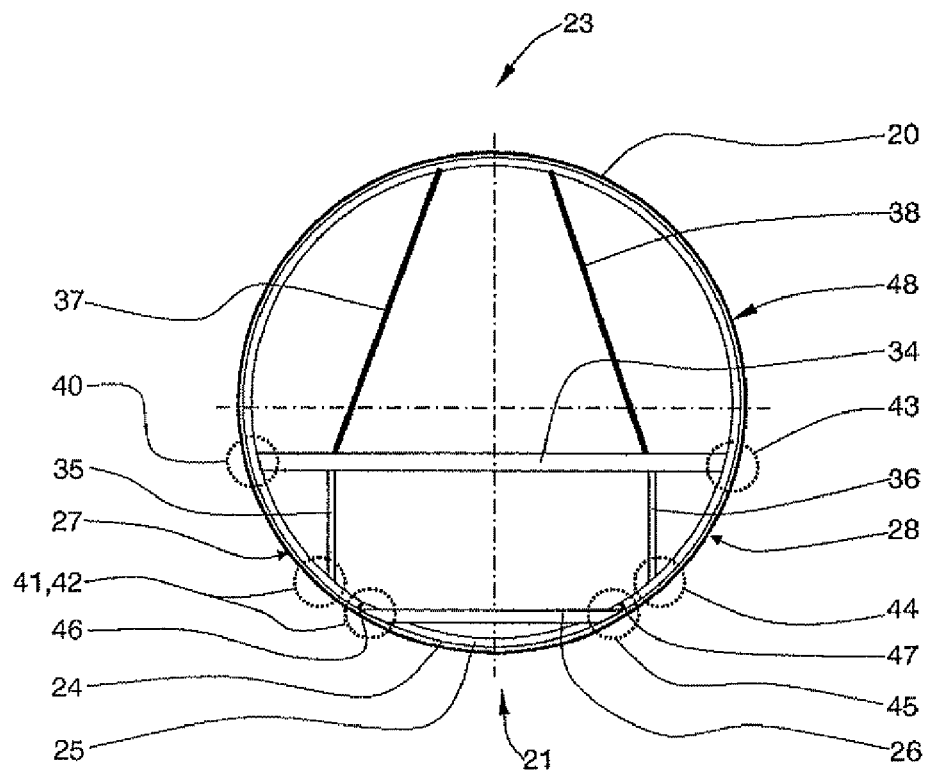
FIG. 6 is a side view of the outer skin segment according to FIG. 5 with the inserted lower shell.

FIG. 6 shows the completed fuselage section 23 in the direction of the vertical arrow 39 as a result of inserting the lower shell 21 into the longitudinal opening 22 in the outer skin segment 20. The final joining operations for finishing the fuselage section 23 are carried out in the regions 40 to 45 which are indicated by the six dotted circles. In particular, two longitudinal seams 46, 47 are produced in regions 41, 45 and run up to an encircling, transverse seam 48 on the back or to the completed partial transverse seam 33.

Depending on the materials used, the joint seams can be formed, for example by riveting, screwing, friction stir welding, bonding or any combination thereof.

List of Reference Numerals 1 outer skin segment (280° upper shell)
1a shell segment
1b shell segment
1c shell segment
2 winding core
3 longitudinal opening
4 outer skin segment (lower shell)
5 lower shell
6 moulding tool
7 annular former segment
8 transverse support
9 outer skin segment
10 annular former
11 longitudinal opening
12 handling device
13 tool
14 outer skin segment
15 annular former segment
16 transverse support
17 lower shell
18 handling device
19 tool
20 outer skin segment (280° upper shell)
21 lower shell
22 longitudinal opening
23 fuselage section
24 outer skin segment (lower shell)
25 annular former segment
26 transverse support
27 side
28 side
29 arrow
30 arrow
31 arrow
32 arrow
33 partial transverse seam
34 floor frame
35 support beam
36 support beam
37 retaining bar
38 retaining bar
39 arrow
40 region
41 region
42 region
43 region
44 region
45 region
46 longitudinal seam
47 longitudinal seam
48 transverse seam (completely encircling)

The invention claimed is:

1. A method for producing a fuselage airframe of an aircraft, wherein a plurality of fuselage sections positioned in tandem is joined together, said method comprising the steps of:
   a) production of an outer skin segment, the outer skin segment having a continuous longitudinal opening on the underside wherein a cross section of the outer skin segment forms an approximately circular curve of greater than 180°,
   b) widening the outer skin segment in order to introduce at least one floor frame into the outer skin segment,
   c) joining the outer skin segment to a rigid fuselage section which is already present by formation of a partial transverse seam,
   d) positioning a prefabricated lower shell in the longitudinal opening, in order to close the outer skin segment on the underside,
   e) completing the partial transverse seam to form a transverse seam and joining the lower shell together with the outer skin segment by formation of at least two longitudinal seams, and
   f) joining the floor frame together with the outer skin segment.

2. The method according to claim 1, wherein further fuselage sections are joined to complete the fuselage airframe.

3. The method according to claim 1, wherein the at least one floor frame is suspended for fixing in position before being joined together with at least two retaining bars.

4. The method according to claim 1, wherein the outer skin segment forms an approximately circular curve of 280°.

5. The method according to claim 1, wherein the lower shell is provided on the inside with a large number of longitudinal reinforcements, in particular with a large number of stringer profiles, and is provided with a large number of annular former segments.

6. The method according to claim 1, wherein the lower shell is formed using a material selected from the group consisting of: a fibre reinforced plastics material, an aluminum alloy material, a glass fibre reinforced aluminum, and any combination thereof.

7. The method according to claim 1, wherein the transverse and longitudinal seams and the joining together of the at least one floor frame with the outer skin segment is effected by riveting, screwing, bonding or any combination thereof.

8. The method according to claim 1, wherein the outer skin segment is formed using a fibre reinforced plastics material, a large number of longitudinal reinforcements, in particular stringer profiles being formed on the inside.

9. The method according to claim 8, wherein a large number of annular former segments is inserted on the inside into the outer skin segment.

10. The method according to claim 1, wherein the outer skin segment is formed using at least two shell segments, the shell segments being formed using an aluminum alloy material and/or with glass fibre reinforced aluminum and the shell segments are welded, in particular friction stir welded, along at least one longitudinal seam.

11. The method according to claim 10, wherein the at least two shell segments are provided on the inside with a large number of longitudinal reinforcements, in particular with a large number of stringer profiles, and are provided with a large number of annular former segments.

12. A method for producing a fuselage airframe of an aircraft, wherein a plurality of fuselage sections positioned in tandem are joined together, the method comprising the steps of:

producing an outer skin segment which forms an approximately circular curve of greater than 180° around its longitudinal axis and defines a continuous longitudinal opening on an underside thereof, expanding the outer skin segment in order to introduce at least one floor frame into an interior of the outer skin segment, joining the outer skin segment to a rigid fuselage section which is already present by forming a partial transverse seam, positioning a prefabricated lower shell in the longitudinal opening of the outer skin segment to close a periphery of the outer skin segment, completing the partial transverse seam to form a transverse seam and joining the lower shell with the outer skin segment by forming at least two longitudinal seams, and joining the floor frame with the outer skin segment.

13. The method according to claim 12, wherein the outer skin segment forms an approximately circular curve about 280° around its longitudinal axis.

14. The method according to claim 12, wherein the outer skin segment is formed using at least two shell segments joined along at least one longitudinal seam.

\* \* \* \* \*